United States Patent Office 2,779,376
Patented Jan. 29, 1957

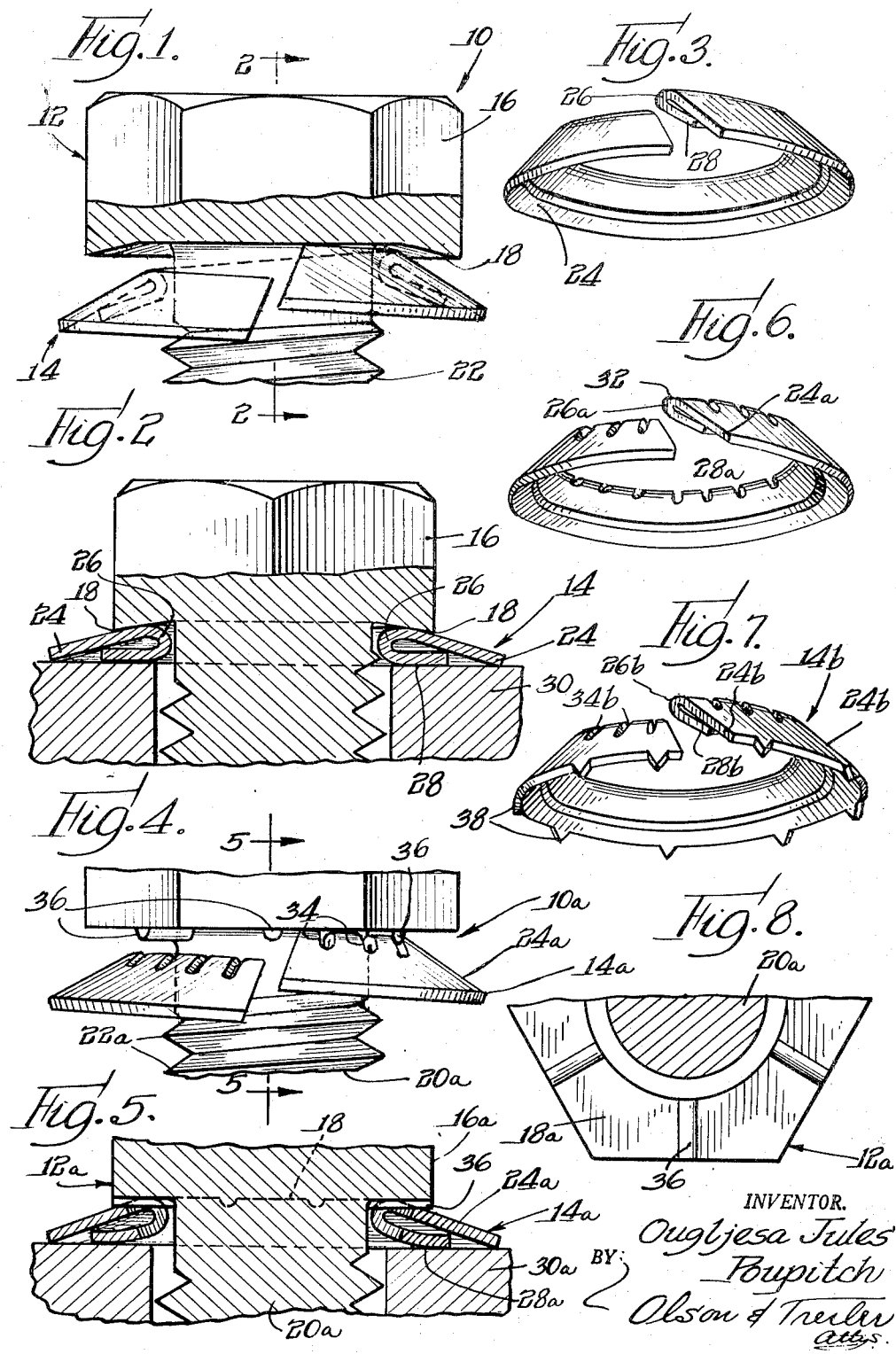

2,779,376

FASTENER HAVING FOLDED, SPLIT-RING HELICAL LOCK WASHER RETAINED THEREON

Ougljesa Jules Poupitch, Itasca, Ill., assignor to Illinois Tool Works, Chicago, Ill., a corporation of Illinois Application May 4, 1955, Serial No. 505,898

7 Claims. (Cl. 151—37)

The present invention relates to a novel preassembled fastener unit, and more particularly to a novel fastener unit including a rotary threaded fastener member such as a nut or a screw and a split-ring type lock washer.

An object of the present invention is to provide a novel preassembled unit including a threaded fastener member and a split-ring lock washer which are interconnected so as to preclude axial separation thereof and which function so as to provide the unit with substantially improved resistance to unauthorized retrograde turning or loosening after the unit has been tightened against a workpiece.

A more specific object of the present invention is to provide a novel preassembled fastener unit of the above described type wherein the lock washer is formed in a novel manner to provide substantially improved locking action, and more particularly the lock washer is formed so that it may be initially compressed under relatively light loads to insure proper seating of the margins of the washer against the fastener member and the work, whereupon the washer provides high resistance to further compression and a substantially stronger spring action for effectively locking the fastener member against retrograde movement.

A further object of the present invention is to provide a novel unit of the above described type which is constructed so as to preclude complete flattening of the lock washer in order to prevent injury thereto and in order to insure that an edge thereof will always be positioned for aggressively engaging the workpiece.

A still further object of the present invention is to provide a novel preassembled fastener unit of the above described general type wherein the fastener member and the lock washer are constructed positively to resist relative rotation therebetween after the unit has been clamped against a workpiece.

Other objects and advantages of the present invention will become apparent from the following description and the accompanying drawings wherein:

Fig. 1 is a fragmentary elevational view of a fastener unit embodying the principles of this invention;

Fig. 2 is a fragmentary sectional view taken along line 2—2 in Fig. 1 and further showing the unit clamped against a workpiece;

Fig. 3 is a perspective view of the novel split-ring type lock washer incorporated in the fastener unit of the present invention;

Fig. 4 is a fragmentary elevational view showing a modified form of the present invention;

Fig. 5 is a fragmentary sectional view taken along line 5—5 in Fig. 4 and further showing the fastener unit clamped against a workpiece;

Fig. 6 is a perspective view showing the novel lock washer utilized in the fastener unit of Figs. 4 and 5;

Fig. 7 is a perspective view showing a further slightly modified lock washer which may be used in combination with the fastener member shown in Figs. 4 and 5; and Fig. 8 is a fragmentary cross sectional view of the fastener member shown in Figs. 4 and 5.

Referring now more specifically to the drawings wherein like parts are designated by the same numerals throughout the various figures, a fastener unit 10 embodying one form of the present invention is shown in Figs. 1 through 3. This fastener unit includes a screw member 12 and a lock washer 14. The screw member comprises a head 16 having a radially extending clamping face 18, and an elongated shank 20 having a plurality of helical thread convolutions 22 thereon.

The sheet material lock washer 14 is preferably formed from spring steel and includes a generally frusto-conical section 24 which is split and helically twisted in the manner shown. The smaller end of the section 24 is disposed adjacent the clamping face of the screw member and is folded inwardly as at 26 and integrally joined with an inner frusto-conical section 28. The internal diameter of the folded portion 26 is less than the outer diameter of the thread convolutions 22, and, in addition, the lock washer is helically twisted oppositely from the helical formation of the thread convolutions whereby the thread convolutions serve to trap the washer in assembled relationship with the screw member.

It should be noted that the free peripheral edge of the outer washer section 24 is disposed substantially radially outwardly from the free edge of the inner section 28 for engaging a workpiece 30 in the manner shown in Fig. 2. Furthermore, the diameter of the outer edge of the section 24 is substantially greater than the diameters of the head and shank so that it engages the workpiece at points spaced a relatively great distance from the axis of the screw whereby the resistance of the washer to turning relative to the workpiece is improved.

When the unit 10 is clamped against the workpiece, the washer is first compressed so that the helical shape thereof is flattened. The folded portion 26 and the double thickness of material provided by the inner and outer conical sections 24 and 28 offer a relatively great resistance to such flattening and therefore improves the locking characteristics of the unit. After the initial compression or flattening of the helix has been accomplished, the outer peripheral edge of the section 24 is pressed firmly against the workpiece and further tightening of the unit causes the conical sections to be axially compressed as shown in Fig. 2. The frusto-conical formation of the sections 24 and 28 provides an even greater resistance to collapsing than the helical formation of the washer whereby the locking characteristics of the unit are further substantially improved. It has been found that by undercutting the clamping surface 18 or by providing these surfaces with a frusto-conical shape in the manner shown, the clamping surface tends to restrain the washer against radial spreading and axial collapsing whereby the locking effectiveness of the unit is still further improved. It should be noted that the helical formation of the washer may be collapsed relatively easily as compared with the conical formation thereof so as to promote engagement of the folded portion 26 about its entire periphery with the clamping face 18 and to promote engagement of the entire peripheral outer margin of the section 24 with their workpieces in order to obtain the maximum locking action. It should also be noted that the inner section 28 of the washer will act as an abutment to prevent complete collapsing of the outer section 24 as shown in Fig. 2 so as to insure that the outer peripheral edge of the section 24 will always aggressively engage the workpiece.

In Figs. 4, 5, 6 and 8 there is shown a modified form of the present invention which is similar to the above described structure as indicated by the application of identical reference numerals with the suffix "a" added to corresponding elements. This embodiment differs in that the smaller end of the section 24a is initially slightly flattened as at 32, and a plurality of circumferentially spaced slots 34 are formed in the slightly flattened portion 32, the folded portion 26a and the inner section 28a, as shown. In addition, the screw member is provided with a plurality of ribs 36 spaced around the clamping face 18a and projecting axially. The ribs 36 are adapted to cooperate with tooth edges defining the slots 34 in the washer to positively interlock the screw member and the washer against relative rotation.

In Fig. 7 there is shown a washer 14b which is similar to the above described washer 14a and is adapted to be used in place of the washer 14a in combination with the screw member 10a. The washer 14b differs only in that it is provided with a plurality of tooth elements 38 spaced circumferentially on the outer margin of the washer section 24b for biting into a workpiece and even more securely restraining relative rotation between the workpiece and the washer. It will be appreciated that, if desired, tooth elements similar to the elements 38 may be provided on the outer margin of the washer shown in Figs. 1 through 3 and described above.

From the above description it is seen that the present invention has provided a novel preassembled fastener unit fully capable of satisfying the objects heretofore set forth. More specifically, it is seen that the present invention has provided a novel preassembled fastener unit wherein the washer is formed to provide double compressibility so as to facilitate initial application and to improve the locking characteristics thereof, and wherein means is provided for preventing complete collapsing of the washer and other means is provided for positively resisting relative rotation between the washer and either the fastener member or the work. The rotary threaded fastener member has been disclosed herein as being a screw member, but it is understood that in certain installations, the screw member may be replaced by a nut member or the like.

While the preferred embodiments of the present invention have been shown and described herein, it is obvious that many structural details may be changed without departing from the spirit and scope of the appended claims.

The invention is claimed as follows:

1. A preassembled rotary fastener unit comprising a threaded rotary fastener member having a generally radially extending clamping face and integral retaining means spaced axially outwardly from said clamping face and projecting generally radially, and a sheet material lock washer including a generally frusto-conical split-ring section having a smaller end disposed adjacent said clamping face, a second frusto-conical split-ring section disposed within said first section and having a smaller end overlying said retaining means, and a split-ring folded section integrally joining the smaller ends of said first and second mentioned frusto-conical sections, said first mentioned section having a free peripheral edge disposed radially and axially outwardly from a free peripheral edge of said second mentioned section.

2. A preassembled rotary fastener unit comprising a threaded rotary fastener member having a generally radially extending clamping face and integral retaining means spaced axially outwardly from said clamping face and projecting generally radially, and a sheet material lock washer including a generally frusto-conical, helically twisted split-ring section having a smaller end disposed adjacent said clamping face, a second frusto-conical, helically twisted split-ring section disposed within said first mentioned section and having a smaller end overlying said retaining means, and a split-ring folded section integrally joining the smaller ends of said first and second mentioned frusto-conical sections, said first mentioned section having a free peripheral edge disposed radially and axially outwardly from a free peripheral edge of said second mentioned section.

3. A preassembled rotary fastener unit comprising a threaded rotary fastener member having a generally radially extending clamping face, a plurality of circumferentially spaced axially projecting protuberance means on said clamping face and integral retaining means spaced axially outwardly from said clamping face and projecting generally radially, and a sheet material lock washer including a generally frusto-conical, helically twisted split-ring section having a smaller end disposed adjacent said clamping face, means providing tooth edges on said smaller end cooperable with said protuberance means for restraining relative rotation between said lock washer and said fastener member, a second frusto-conical, helically twisted split-ring section disposed within said first mentioned section and having a smaller end overlying said retaining means, and a helically twisted split-ring folded section integrally joining the smaller ends of said first and second mentioned frusto-conical sections, said first mentioned section having a free peripheral edge disposed radially and axially outwardly from a free peripheral edge of said second section.

4. A preassembled fastener unit comprising threaded rotary fastener member having a generally radially extending clamping face and integral retaining means spaced axially outwardly from said clamping face and projecting generally radially, and a sheet material lock washer including a generally frusto-conical, helically twisted split-ring section having a smaller end disposed adjacent said clamping face, a second frusto-conical, helically twisted split-ring section disposed within said first mentioned section and having a smaller end overlying said retaining means, a helically twisted split-ring folded section integrally joining the smaller ends of said first and second mentioned frusto-conical sections, and tooth means projecting from said first mentioned section radially and axially outwardly from a free peripheral edge of said second section for engaging a workpiece.

5. A preassembled fastener unit comprising a threaded rotary fastener member having a generally radially extending clamping face, a plurality of circumferentially spaced protuberance means projecting axially from said clamping face, and integral retaining means spaced axially outwardly from said clamping face and projecting generally radially, and a sheet material lock washer including a generally frusto-conical, helically twisted split-ring section having a smaller end disposed adjacent said clamping face, means providing tooth edges on said smaller end cooperable with said protuberance means for retraining relative rotation between said lock washer and said fastener member, a second frusto-conical, helically twisted split-ring section disposed within said first section and having a smaller end overlying said retaining means, a helically twisted split-ring folded section integrally joining the smaller ends of said first and second mentioned frusto-conical sections, and tooth means projecting from said first mentioned section radially and axially outwardly from a free peripheral edge of said section for engagement with a workpiece.

6. A preassembled rotary fastener unit comprising a threaded rotary fastener member having a generally radially extending and axially flaring clamping face, and integral retaining means spaced axially outwardly from said clamping face and projecting generally radially, and a sheet material lock washer including a generally frusto-conical, helically twisted split-ring section having a smaller end disposed adjacent said clamping face, a second frusto-conical, helically twisted split-ring section disposed within said first mentioned section and having a smaller end overlying said retaining means, and a helically twisted split-ring folded section integrally joining the smaller ends of said first and second mentioned frusto-conical sections, said flaring clamping face serving to resist radial spreading and collapsing of the washer when the unit is applied to a workpiece.

7. A preassembled rotary fastener unit comprising a threaded rotary fastener member having a generally radially extending clamping face and integral retaining means spaced axially outwardly from said clamping face and projecting generally radially, and a sheet material lock washer including a generally frusto-conical, helically twisted split-ring section having a smaller end disposed adjacent said clamping face, a second frusto-conical, helically twisted split-ring section disposed within said first section and having a smaller end overlying said retaining means and a larger end substantially against said first mentioned section, and a helically twisted relatively sharply folded split-ring section integrally joining the smaller ends of said first and second mentioned frusto-conical sections, said first mentioned section having a peripheral edge disposed radially and axially outwardly from the larger end of said second mentioned section.

References Cited in the file of this patent

UNITED STATES PATENTS

| | | |
|---|---|---|
| 1,504,511 | Ross | Aug. 12, 1924 |
| 1,631,819 | Ivory | June 7, 1927 |
| 1,847,314 | Stoll | Mar. 1, 1932 |
| 2,270,813 | Olson | Jan. 20, 1942 |
| 2,278,062 | DeKoharovich | Mar. 31, 1942 |
| 2,372,653 | Becket | Apr. 3, 1945 |
| 2,424,208 | Poupitch | July 15, 1947 |
| 2,681,678 | Hage | June 22, 1954 |